United States Patent
Lo et al.

(10) Patent No.: US 10,368,318 B2
(45) Date of Patent: Jul. 30, 2019

(54) WIRELESS OPERATION IN VERY HIGH DENSITY ENVIRONMENTS

(75) Inventors: Waichi Lo, Kanata (CA); Roland Smith, Nepean (CA); Chris Williams, Nepean (CA); Stephen Rayment, Ottawa (CA); Michael Russell, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 738 days.

(21) Appl. No.: 12/982,081

(22) Filed: Dec. 30, 2010

(65) Prior Publication Data

US 2012/0170514 A1    Jul. 5, 2012

(51) Int. Cl.
*H04W 4/00*    (2018.01)
*H04W 52/26*   (2009.01)
*H04W 52/14*   (2009.01)

(52) U.S. Cl.
CPC ........ *H04W 52/262* (2013.01); *H04W 52/143* (2013.01)

(58) Field of Classification Search
CPC .................................................. H04W 52/262
USPC ..................... 370/328, 412–418; 455/522
See application file for complete search history.

(56) References Cited

U.S. PATENT DOCUMENTS

| | | | | | |
|---|---|---|---|---|---|
| 6,032,031 | A * | 2/2000 | Takaki | .............. | H03G 3/3068 330/149 |
| 6,385,462 | B1 * | 5/2002 | Baum | .............. | H04W 52/265 455/522 |
| 7,760,681 | B1 * | 7/2010 | Chhabra | ............. | 370/328 |
| 8,295,153 | B2 * | 10/2012 | Nentwig | ............. | H04L 5/0007 370/204 |
| 8,860,525 | B2 * | 10/2014 | Manssen | ............. | H03H 7/40 333/17.3 |
| 9,491,722 | B2 * | 11/2016 | Yavuz | ............. | H04W 52/244 |
| 2003/0087644 | A1 * | 5/2003 | Miyoshi et al. | ............. | 455/452 |
| 2003/0142637 | A1 * | 7/2003 | Khawer et al. | ............. | 370/318 |
| 2004/0013207 | A1 * | 1/2004 | Sartori et al. | ............. | 375/297 |
| 2004/0142699 | A1 * | 7/2004 | Jollota et al. | ............. | 455/452.2 |
| 2005/0157639 | A1 * | 7/2005 | Song et al. | ............. | 370/208 |

(Continued)

OTHER PUBLICATIONS

ISR and Written Opinion dated Oct. 19, 2011 for PCT Application No. PCT/CA2010/002065.

(Continued)

*Primary Examiner* — Parth Patel
(74) *Attorney, Agent, or Firm* — Christopher & Weisberg, P.A.

(57) ABSTRACT

Protocols and algorithms for contention-based adaptive modulation networks, typically used in unlicensed bands. A wireless system in which high modulation rate packets are prioritized over low rate packets. The wireless system is configured to process communication signals from plural user portable devices having wireless access points capable of dynamically adjusting access point transmit power on a user-by-user basis to a minimum level required to achieve a target signal-to-noise ratio from each user portable device irrespective of the interference observed on the link is also disclosed. The wireless system is also capable of dynamically adjusting access point transmitter power and receiver sensitivity on a user-by-user basis to a minimum level required to achieve the highest possible modulation rate.

14 Claims, 7 Drawing Sheets

(56) References Cited

U.S. PATENT DOCUMENTS

| | | | |
|---|---|---|---|
| 2006/0092889 A1* | 5/2006 | Lyons | H04W 16/08 370/338 |
| 2006/0121928 A1* | 6/2006 | Itsuki | 455/522 |
| 2006/0121946 A1 | 6/2006 | Walton et al. | |
| 2007/0019584 A1* | 1/2007 | Qi | H04W 36/04 370/331 |
| 2007/0183392 A1* | 8/2007 | Tandai | H04W 52/245 370/350 |
| 2007/0183442 A1* | 8/2007 | Shibata | 370/437 |
| 2008/0056177 A1* | 3/2008 | Mori et al. | 370/318 |
| 2008/0113634 A1* | 5/2008 | Gates | H04B 1/406 455/102 |
| 2008/0220803 A1 | 9/2008 | Lee | |
| 2008/0268778 A1* | 10/2008 | De La Garrigue et al. | 455/41.2 |
| 2009/0042596 A1* | 2/2009 | Yavuz | H04W 52/40 455/522 |
| 2009/0213722 A1* | 8/2009 | Backes et al. | 370/201 |
| 2009/0280857 A1 | 11/2009 | Batra | |
| 2009/0310586 A1 | 12/2009 | Shatti | |
| 2010/0022262 A1* | 1/2010 | Aue | 455/501 |
| 2010/0056205 A1* | 3/2010 | Fuss | H04W 88/10 455/553.1 |
| 2010/0157910 A1* | 6/2010 | Nentwig et al. | 370/329 |
| 2010/0189013 A1* | 7/2010 | Bims | H04B 7/022 370/254 |
| 2010/0197340 A1 | 8/2010 | Lin | |
| 2011/0034201 A1* | 2/2011 | Hamada | H04L 67/12 455/517 |

OTHER PUBLICATIONS

Vikas Kawadia and P. R. Kumar, *Power Control and Clustering in Ad Hoc Networks*—Department of Electrical and Computer Engineering, and Coordinated Science Laboratory, University of Illinois at Urbana-Champaign, IEEE INFOCOM 2003.

Improving UMTS and HSDPA Coverage 5-Fold with with Inward-Facing Cells in a Simulcast Architecture—ADC Telecommunications, Inc White Paper Sep. 2009.

Voice over Wireless LAN 4.1 Design Guide—Voice over WLAN Radio—Chapter 3—www.cisco.com/en/US/docs/solutions/Enterprise/Mobility/vowlan/41dg/vowlan_ch3.htm Zhi Zhou et al., "Joint tuning of physical carrier sensing, power and rate in high-density WLAN", Proceedings of Asia-Pacific conference on Communications 2007, pp. 134-137, Bangkok, Oct. 18-20 2007.

Aditya Akella et al., "Self-Management in Chaotic Wireless Deployments", MobiCom'05, Aug. 28-Sep. 2, 2005, Cologne, Germany, pp. 185-198.

Hariharasudhan Viswanathan, "Adaptive transmit power control based on signal strength and frame loss measurements for WLANs", Oct. 2009, Master's thesis, Rutgers The State University of New Jersey.

Partial supplementary European search report for European Patent Application No. 10 86 1500, dated Nov. 13, 2015.

English translation of the Jan. 11, 2017 Third Office Action for Chinese Patent Application No. 201080071013.8.

Examination Report issued by the Canadian Intellectual Property Office dated Jan. 19, 2018 in corresponding Canadian Patent Application No. 2,821,198, consisting of 5 pages.

Examination Report issued by the European Patent Office dated Apr. 30, 2018 in corresponding European Patent Application No. 10 861 500.6, consisting of 7 pages.

Examination Report issued by the Canadian Patent Office dated Nov. 27, 2018 in corresponding Canadian Patent Application No. 2,821,198, consisting of 4 pages.

\* cited by examiner

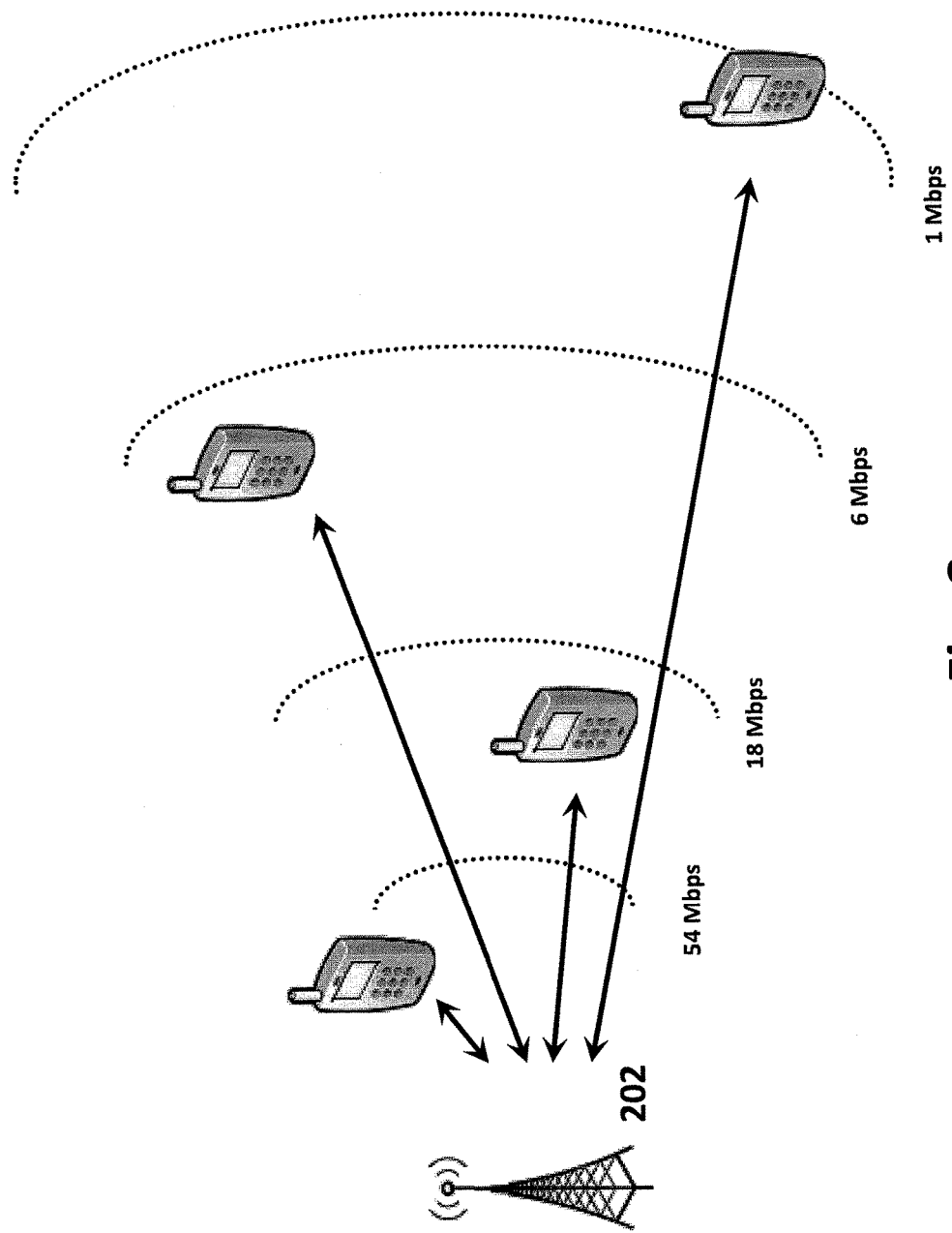

WIRELESS OPERATION IN VERY HIGH DENSITY ENVIRONMENTS

TECHNICAL FIELD

The present disclosure relates to wireless communication systems. More specifically, the present invention relates to enhancements to protocols and algorithms for contention-based adaptive modulation networks, typically used in unlicensed bands (e.g., Wi-Fi). These enhancements enable operation in areas with a high density.

BACKGROUND

With the advent and extreme popularity of smart mobile devices (e.g., the iPhone, BlackBerry, and other Smart Phones), data usage has increased to a point where network congestion caused by bandwidth-hungry devices has led to a looming spectrum crisis that is the biggest threat to the future of mobile telecommunications in America. Evidence of this spectrum crisis is evident, notably at the presidential inauguration in January of 2009, where hundreds of thousands of people gathered to witness the historical event. It is well documented that the cellular network became so congested that no calls were possible. Similarly, cellular network congestion has become a common global occurrence at virtually every major spectator event.

Presently, most wireless networks are optimized to deliver the greatest range and coverage, as this reduces the cost of equipment required for a given area. To achieve this goal, higher radio power, better receive sensitivity, and high gain antennas are all used at the base stations or Access Points (APs). However, in very high-density applications, such as special events, temporary events, emergency events, stadiums, etc., user densities are extremely high; sometimes on the order of users-per-square-meter. In this case, the number of APs should be greatly increased in order to achieve the desired capacity by re-using frequencies throughout the venue. Unfortunately, this increase in density also greatly reduces the probability of interference between APs in the network, thereby nullifying the potential for re-use. In addition, user portable devices (typically erroneously) connecting to APs from long distances, and hence low signal levels, and hence low data rates, should be limited.

Cell-splitting is a common technique used throughout the cellular industry to increase network capacity where available spectrum is scarce. The cellular network derived its name from the deployment techniques used to provide coverage areas. High powered radio frequency transceivers, called macro base transceiver systems (BTS's), were deployed on roof tops and tall towers and by using high gain directional antennas created a contiguous arrangement of "cells" most typically depicted as an hexagonal honeycomb lattice structure. These BTS elements were all interconnected with T1 or T3 wired circuits to central network elements leading to the "cellular network".

As capacity grew, BTS systems added additional radio frequency channels, while improving the efficiency of the radio signal. First generation BTS employed Analog Mobile Phone System (AMPS) that supported a single cellular user per carrier. AMPS was superseded by Time Division Multiple Access (TDMA) supporting three cellular users per carrier. Cellular technology has steadily progressed with twenty years of improvements and new protocols—GSM, CDMA, 2G, 3G, 4G, new modulation formats, and smart antenna/Multiple In Multiple Out (MIMO) systems—such that the utilization of radio frequency spectrum for the cellular network is now so highly optimized that significant capacity gains are no longer possible using the existing network infrastructure cell locations.

Consequently, cell-splitting techniques have been introduced to further capacity. In addition, Distributed Antenna Systems (DAS) were introduced to provide better coverage in office buildings. More recently, there has been an introduction of limited coverage micro-cells and pico-cells for high capacity applications.

It is evident that the evolution of the cellular/wireless industry has shifted from larger macro-cells to smaller pico-cells with greater improvements in spectral and spatial efficiency of licensed band cellular networks.

Unlicensed band networks have evolved in a somewhat divergent path, due to the impact of multiple wireless services sharing the same bands and the requirement for improved coverage. Unlicensed band networks, such as Wi-Fi, were the first to incorporate advanced spectral and spatial techniques to achieve high levels of spectral and spatial efficiency. However, unlicensed band networks have grown, in contrast to the licensed band cellular networks trends, by starting from very small cells limited by low transmitter power, typically 25 mW (14 dBm), to achieve cell sizes sufficient to cover a house. They have improved to the point of meeting the Industrial Scientific Medical (ISM) band regulatory limits 4 W (36 dBm) to provide coverage of large hot spots such as malls or train stations.

Unlicensed band products are also divergent in their network planning/adaptation techniques. Cellular network cell sizes are defined by the transmitted power, modulation formats used, or in the case of CMDA systems, by the spreading codes employed, and have been engineered by network designers and, more recently, by automated software tools used to optimize cell locations and sizes. Unlicensed cells have been autonomous in nature with no central control mechanisms to set the cell sizes. Each unlicensed transceiver has employed techniques to achieve the maximum cell size at the highest transmitter power available. Wi-Fi radios have employed spectral (modulation rate adaptation) and spatial (e.g., maximal ratio combining and spatial time block coding) techniques to achieve the greatest possible cell sizes.

Modulation rate adaptation algorithms are well documented in the Wi-Fi industry to achieve these goals of maximum coverage at the highest throughput. These algorithms are designed for Carrier Sense Multiple Access/Collision Avoidance (CSMA/CA) protocols, where if a transmitted packet is not acknowledged, the transmitter adjusts/reduces the modulation rate and retransmits the packet again at the same maximum allowed power level. Rate adaptation algorithms are provided by the wireless chip manufacturers and form the de-facto operation of all Wi-Fi and wireless devices, so that all devices behave similarly to achieve the maximum coverage at the highest modulation rate.

These algorithms work well in standard wireless networks, but do not work well in very high capacity venues which are interference limited, such as sports stadiums, outdoor concerts, emergency events, temporary events such as carnivals, theme parks, and some very high density urban environments, where the user densities may be measured on the order of users per square meter.

SUMMARY OF THE INVENTION

The present disclosure addresses the unique and innovative aspects of very high capacity wireless networks in the presence of high interference. In these environments, thousands of wireless users may be actively and concurrently accessing the network in a space-limited venue. A typical example is a baseball stadium, where thousands of smart phone users attempt to access the wireless network either to up-load videos or photos of the game, or to download instant replays or other such information. All of these smart phone users are located inside the same stadium that may measure approximately 200 m×300 m (60,000 sq m) and may contain more than 100,000 users resulting in a density of 1.6 users per square meter.

A standard wireless AP optimized for reach may see as much as half of the users in the stadium, but clearly unable to support the required throughput of the thousands of smart phone users, all of which are attempting to access the Internet. Throughput would be unacceptably low, due to the high levels of contention, interference and collisions. Adding enough conventional wireless APs to meet the capacity need would still not solve the problem because these additional APs would each see each other and create self-interference. The present disclosure addresses key aspects of an unlicensed wireless network that is specifically designed for very high capacity environments.

According to a first aspect of the present invention, a wireless system configured to process communications signals from plural user portable devices is provided. The wireless system preferably comprises plural access points, each access point having a processor configured to dynamically adjust access-point transmitter power and receiver sensitivity on a user-by-user basis to a minimum level required to achieve the highest possible modulation rate.

According to a second aspect of the present invention, a wireless system configured to process communication signals to and from plural user portable devices is provided. The wireless system comprises plural wireless access points, each access point having a processor configured to dynamically adjust access-point transmit power on a user-by-user basis to a minimum level required to achieve a target, predetermined signal-to-noise ratio with each user portable device irrespective of the interference observed on the link.

In certain embodiments, the wireless system may comprise an access point that monitors and maintains a table of the Receive Signal Strength Indication of all associated user portable devices. The access point transmit power and receive sensitivity to a device may also be adjusted to a minimum level required to achieve a desired Signal to Noise Ratio.

In alternative embodiments, the access point adjusts transmit power and receive sensitivity in Time Division Duplexing systems based on Receive Signal Strength Indication. The wireless system's access point may also make transmit power adjustments on a per packet basis.

In alternative embodiments, the wireless system may use a dual mode algorithm which is capable of both dynamic power control to maintain the highest data modulation rate and a dynamic modulation rate adjustment to reduce the modulation rate for occasional devices that may have different requirements compared to conventional devices or applications. The dual mode algorithm may cause an increase in power, or a reduction in the modulation rate, on a case-by-case basis.

According to a third aspect of the present invention, a wireless system configured to process communication signals from plural user portable devices is provided. The wireless system comprises plural wireless access points, each access point having a processor configured to process high modulation rate packets before low rate packets.

In certain embodiments, the wireless system uses an algorithm to assign an amount of credit to each packet based on the modulation rate of the packet where the amount of credit assigned to each packet may or may not be directly proportional to the modulation rate of the packet. The wireless system may search a transmit queue for a packet with credit and wherein the packet with credit is queued to an access point and the amount credit for that rate packet is reduced. The wireless system may be capable of penalizing a packet by reducing the amount credit or by moving the packet further away from the head of a queue.

For this application the following terms and definitions shall apply:

The terms "communicate," and "communicating" and as used herein include both conveying data from a source to a destination, and delivering data to a communications medium, system, channel, network, device, wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

The term "processor" as used herein means processing devices, apparatus, programs, circuits, components, systems and subsystems, whether implemented in hardware, tangibly-embodied software or both, and whether or not programmable. The term "processor" as used herein includes, but is not limited to one or more computers, hardwired circuits, signal modifying devices and systems, devices and machines for controlling systems, central processing units, programmable devices and systems, field programmable gate arrays, application specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data.

The term "portable user device" as used herein means an electrical or non-electrical device capable of being carried by or on the person of a user or capable of being disposed on or in, or held by, a physical object (e.g., attaché, purse) capable of being carried by or on the user, and having at least one function of primary benefit to such user, including without limitation, a cellular telephone, a personal digital assistant ("PDA"), a Blackberry device, a radio, a television, a game system (e.g., a Gameboy™ device), a notebook computer, a laptop/desktop computer, a GPS device, a personal audio device (such as an MP3 player or an iPod™ device), a DVD player, a two-way radio, a personal communications device, a telematics device, a remote control device, a wireless headset, a wristwatch, a portable data storage device (e.g., Thumb™ drive), as well as any devices combining any of the foregoing or their functions.

DESCRIPTION OF THE DRAWINGS

These and other advantages of the present invention will be readily understood with reference to the following specification and attached drawing wherein:

FIG. 2 is a diagram illustrating Signal to Noise Ratio based modulation rate control;

DETAILED DESCRIPTION

Preferred embodiments of the present invention will be described herein below with reference to the accompanying drawings. In the following description, well-known functions or constructions are not described in detail since they would obscure the invention in unnecessary detail.

Described herein are a number of steps, methods and/or solutions which can be applied to greatly improve the coverage and efficiency of a data network. These steps, methods and/or solutions may include one ore more of managing: Static Power Control, Dynamic Power Control, SNR-Based Modulation Rate, Downstream Traffic Prioritization, Foreign Packet Rejection, Packet De-aggregation, Admission Control, Broadcast Control, and/or Physical Network Design. Each step, method and/or solution may be applied individually or in combination with one or more other steps, methods and/or solutions.

Static Power Control. A first solution may be to apply Static Power Control. Rather than maximizing the size of the cell, the system disclosed in the present embodiment limits cell size to a minimum size required to maintain proper function. The minimum size may be determined by the spacing between the APs, and the distance to the user portable device or devices. The present disclosure introduces a system to reduce transmit power and/or receive sensitivity to the minimum levels required to achieve optimal AP to user links.

An important benefit of reducing transmit power and receive sensitivity is the reduction in self interference. APs on the same or adjacent channels, especially if mounted high and/or within line-of-sight (LoS) of each other, can interfere with each other. Reducing power below the levels of the user portable devices (typically about 15 dBm) may not further increase system performance. Although it may be possible to manually adjust transmit power and receive sensitivity, this would have to be done on a site-by-site, AP-by-AP basis. This approach is possible, but may be very time consuming, error prone and particularly onerous in temporary deployments.

The system disclosed herein is capable of automatically making all adjustments. For example, both power and sensitivity may be adjusted based on the power measured by an AP from neighboring APs.

Figure 1A:
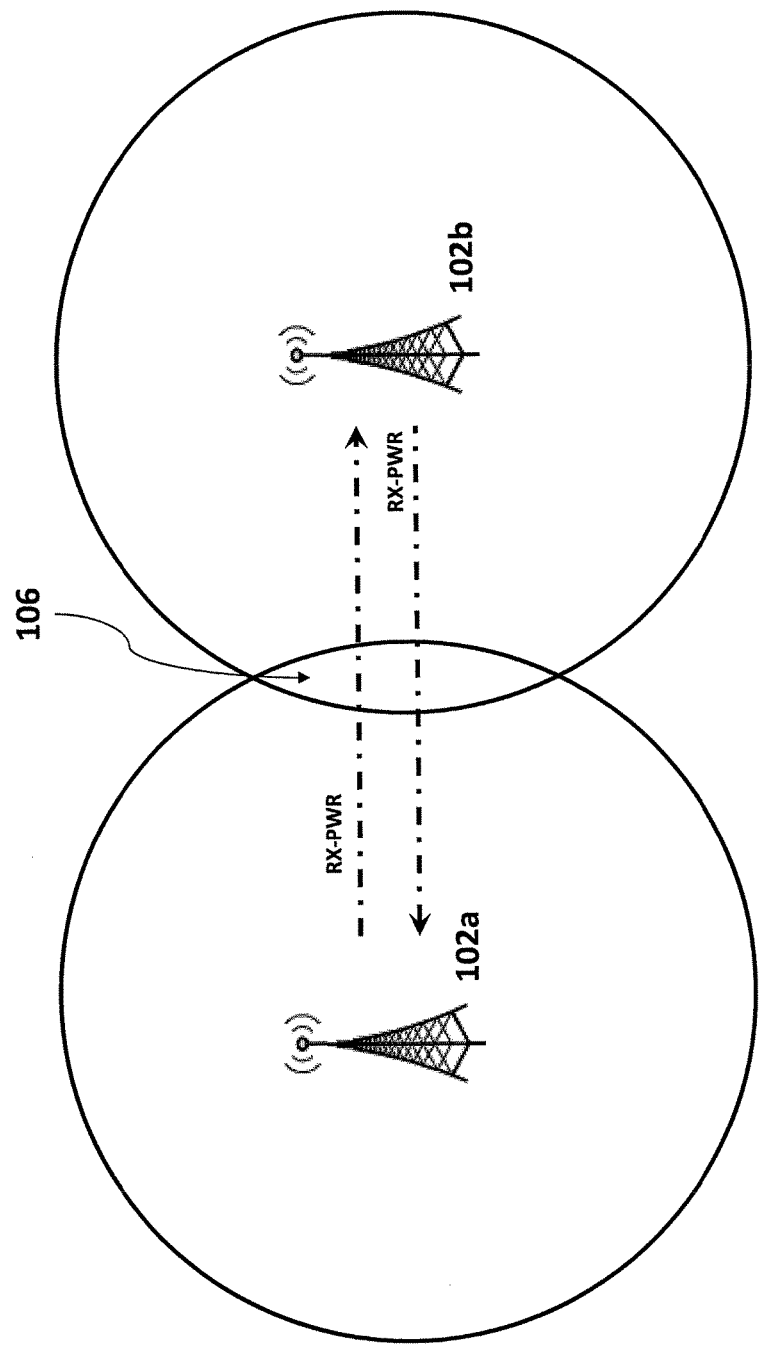
FIG. 1a is a high-level diagram illustrating communication between transmitting and receiving access points.

Referring now to FIG. 1a, a receiving AP 102b can message back to the transmitting AP 102a, via a special management frame with an indication of the power received (Rx-PWR) from the transmitting AP 102. The transmitting AP 102a then adjusts its power according to a preset or dynamic setting, typically to achieve a desired level of cell overlap 106. The cell overlap 106 is the coverage area where one or more APs 102 overlap (e.g., transmitting AP 102a and a neighboring receiving AP 102b).

The desired amount of cell overlap 106 may be the amount of overlap needed to provide adequate coverage without interference from nearby APs 102. The preset setting may be a stored value, or set of values, which can increase or decrease the AP's 102 power depending on the desired amount of cell overlap 106.

Managing cell overlap 106 size is important because a large cell overlap 106 impacts service delivery in urban areas and inside of buildings, where service may be most relied upon and where the lack of isolation limits network bandwidth in densely populated areas. A typical Voice over WLAN (VoWLAN) network often requires a cell overlap 106 of around 20 percent (2.4 GHz), and approximately 15 to 20 percent (5 GHz), where a WLAN Data design may use an AP 102 cell overlap 106 of 5 to 10 percent. A purpose of cell overlap 106 is to ensure that a radio can detect and connect to alternative APs 102 when close to the boundary of a cell. Allowing a radio to change APs 102 with a minimal connection interruption by minimizing the amount of data rate shifting and retransmission at a cell boundary for a given client. The optimal VoWLAN cell boundary recommendation may be around −67 dBm.

For example, if an AP 102 is operating at power "X", but the cell overlap 106 is too large, AP's 102 power may decrease to a preset value of "X−Y" so that the overlap is reduced, or minimized (e.g., around 20%). However, if the cell overlap 106 is too small or nonexistent, the AP's 102 power may increase to a second preset power value "X+Z" (where "Y" may or may not be equal to "Z") such that the cell overlap 106 is increased to the desired cell overlap 106 size.

In lieu of a stored preset setting, the AP's 102 power adjustments may be dynamically increased or decreased depending on the degree, or amount, of cell overlap 106. This dynamic system may be configured such that a preferred amount of cell overlap 106 is preserved where each AP's 102 power may be increased or decreased in order to maintain the desired amount of cell overlap 106.

Figure 1B:
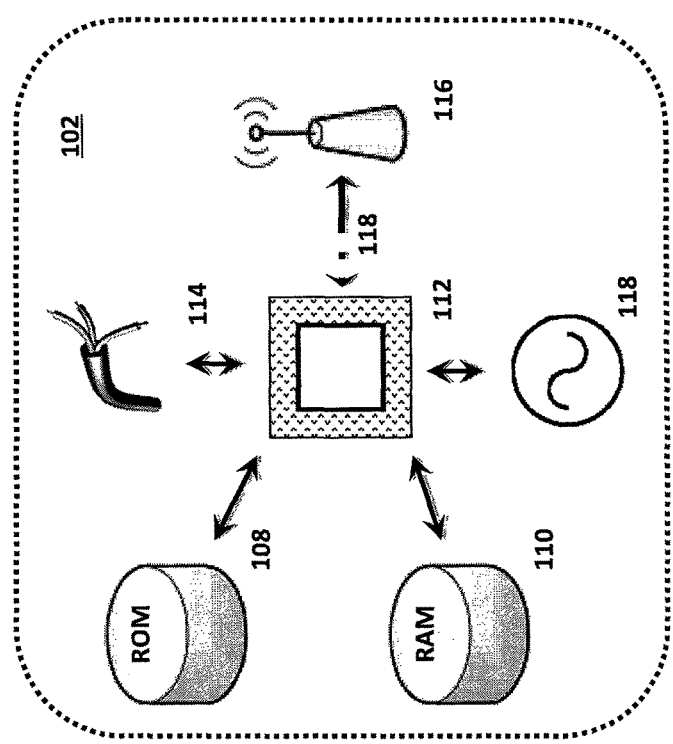
FIG. 1b is a diagram illustrating an access point.

Referring now to FIG. 1b, each AP 102 may comprise a processor 112, power supply 118, antenna 116, wired communication link 114, interface 118 (e.g., RF transceiver, RF front end, etc.) and storage memory including RAM 110 and ROM 108.

Figure 1C:
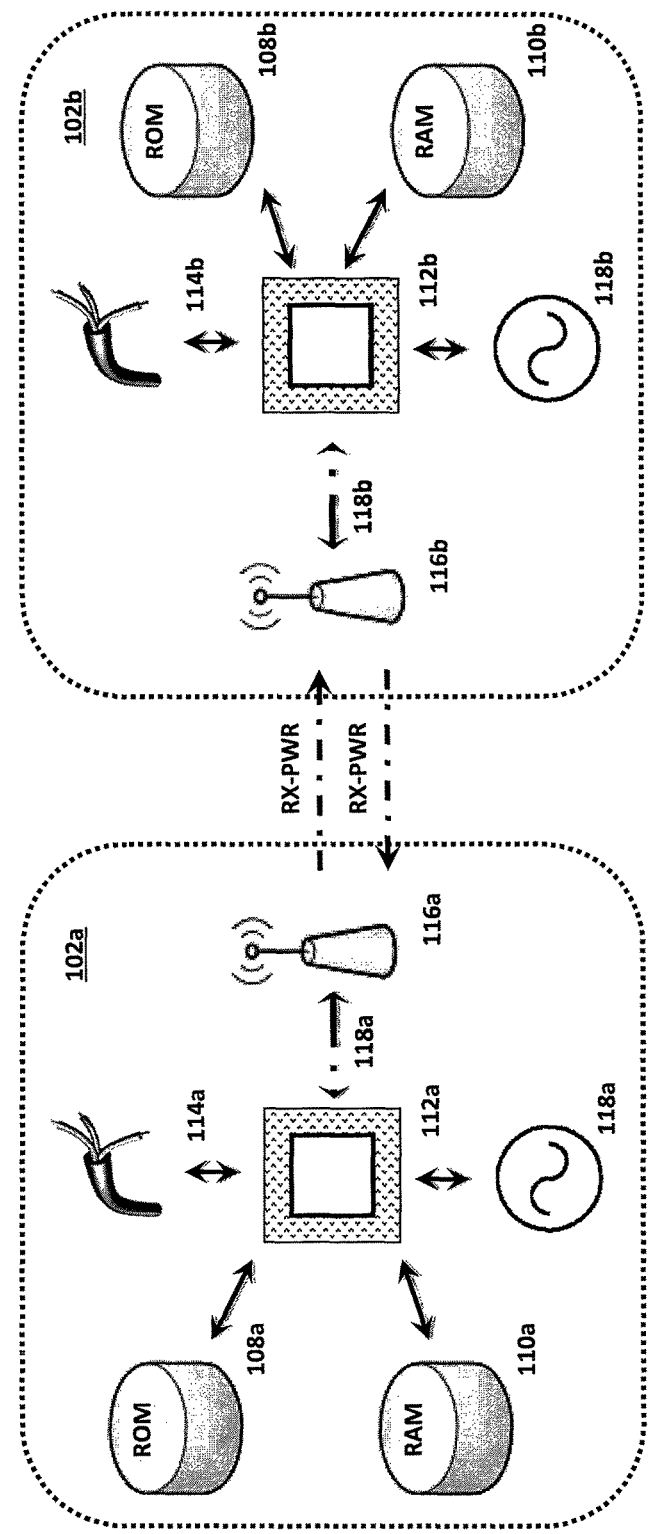
FIG. 1c is a block diagram illustrating communication between transmitting and receiving access points.

Referring now to FIG. 1c, the system of FIG. 1a is described in greater detail. Receiving AP's 102b antenna 116b receives the management packet with the Rx-PWR from the transmitting AP 102a and sends it through an interface 118b to processor 112b. Processor 112b processes and manipulates the data to determine whether the power should be adjusted and whether it should be increased or decreased. To process and manipulate the data, the processor 112b may be equipped to run software which can be stored to the ROM 108b. Data collected or created by the AP 102 may be stored to the RAM 110b or stored to the ROM 108b for longer term retention. Data collected or created by the AP 102 may also be communicated to another AP 102 or any other device capable of wired or wireless communication. The processor 112b and other hardware are powered by power supply 118b, which may be alternating or direct current (e.g., traditional line current, battery power, solar power, wind power, etc.). In certain embodiments, AP 102a may communicate with AP 102b using a wired communication link 114a in addition to, or in lieu of, the antenna 116a and wireless interface 118a.

Figure 4:
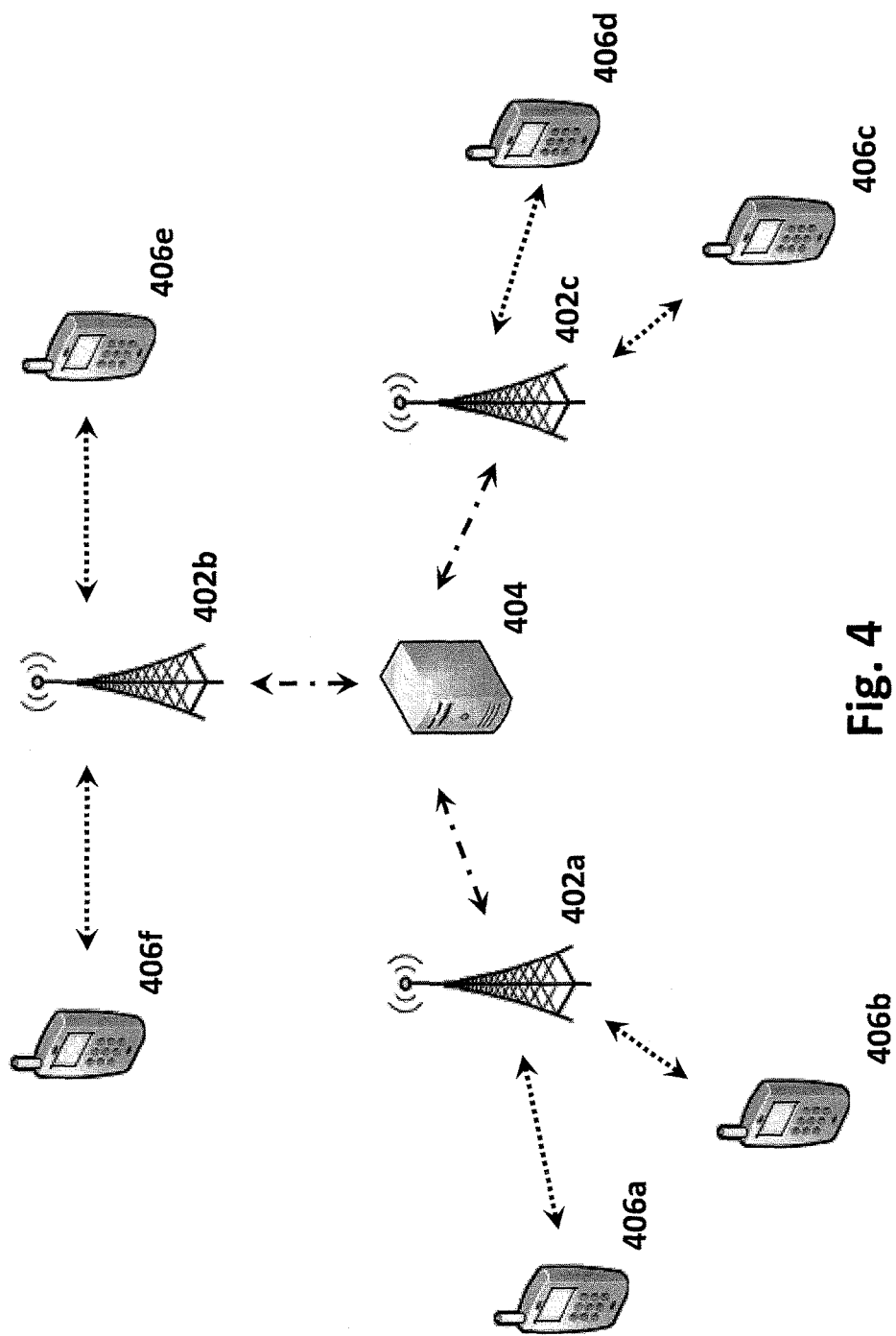
FIG. 4 is a diagram illustrating a subtending network management element.

Referring now to FIG. 4, when multiple radios 406 are in proximity of each other, a subtending network management element 404 in communication with each of the APs 402 may use the data collected (e.g., signal strength, distances etc.) to make better educated decisions about adjustments at each AP 402. This network management element 404 allows for the adjustment of power and sensitivity of each AP 402 by interpreting the Rx-PWR messages from one or more surrounding APs 402, along with the known distance between the AP and surrounding one or more APs 402.

For example, if the subtending network management element 404 determines that AP 402a and 402c each have a high signal strength, but are in very close proximity to one another, the subtending network management element 404 may cause one or both of the APs 402a/402c to decrease the output power. Similarly, if the subtending network management element 404 determines that AP 402a and 402c each have low signal strengths, the subtending network management element 404 may cause one or both of the APs 402a/402c to increase the output power. In certain embodiments, the subtending network management element 404 may find that an AP 402 has a large number of radios 406 on a single AP 402 and, in response, the subtending network management element 404 may increase the power to surrounding APs 402.

AP locations are typically identified by longitude/latitude (long-lat) co-ordinates which can either be manually entered (e.g., upon installation) or calculated using a GPS receiver (e.g., integral with the AP).

Radio transmit power may be readily adjusted, typically under software control. An example method of adjusting transmit power is disclosed in U.S. Patent Publication No. 2008/0220803 to Joo Hyung Lee, which is hereby incorporated by reference in its entirety herein. Lee teaches the method of adjusting transmit power by obtaining the signal strength parameter value for the received signal. The method then requests for an increase (and later a decrease) in transmission power in response to the received signal strength parameter value. From these values, an accumulated signal strength parameter value may be calculated for the received signal over an accumulation period. The lower signal strength parameter value range (or the upper signal strength parameter value range) may be adjusted dependent on the accumulated signal strength parameter value. Another example method of adjusting transmit power is disclosed in U.S. Patent Publication No. 2010/0197340 to Wen-Pin Lin, which is hereby incorporated by reference in its entirety herein. Analogous to the method taught by Lee, Lin teaches a method that receives a request (via a communications protocol) from a remote unit to provide a power level associated with a transmitting component of a base station for a cellular network communications system. The power level of a signal is then measured and provided by the transmitting component in response to receiving the request from the remote unit; and providing, from the base station, the measured power level to the remote unit over the communications protocol.

Figure 5:
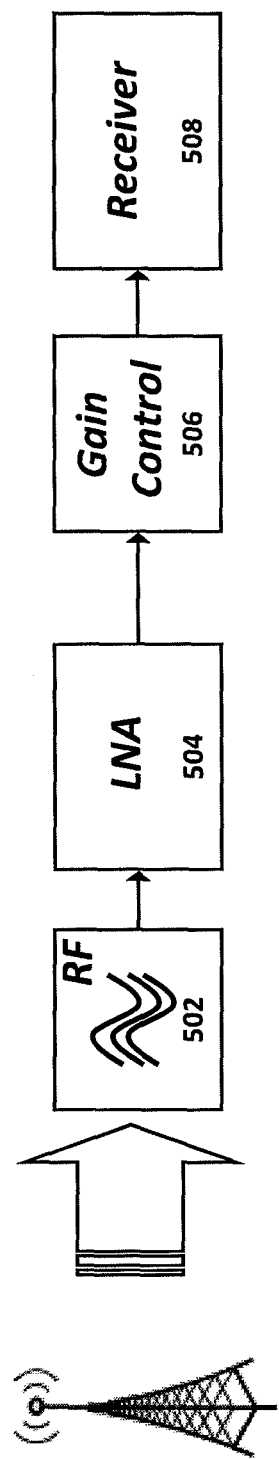
FIG. 5 is a block diagram illustrating the digital control of an incoming radio signal.

However, reduction in receive sensitivity may be somewhat more difficult with fully integrated radios. Referring to FIG. 5, the gain elements of an incoming radio signal 502 may be digitally controlled 506 (e.g., automatic gain control), typically after a Low Noise Amplifier (LNA) 504 but before the receiver 508. While this method may be possible, it may also be costly to implement. Some contemporary integrated radios are capable of providing gain control of the receiver. In these radios, simple software modifications to the control are used to alter the gain settings and hence reduce sensitivity.

Dynamic Power Control. Another approach is to apply Dynamic Power Control. This disclosure introduces a unique form of transmit power and/or receive sensitivity control known as Dynamic Power Control. Dynamic Power Control is capable of determining, at an AP, the power level received from one or more portable devices then adjusting, based on the power level received from one or more portable devices, the power being transmitted by the AP to a minimum power level required for communication with the one or more portable devices. For example, an AP may determine the power received (Rx-PWR) from a user's portable device. The AP's transmitting power is then adjusted according to a preset or dynamic setting for each of the portable devices.

Conventional wireless APs attempt to maximize cell coverage by maintaining a constant single transmit power level and a constant receive sensitivity. This is typically accomplished by reducing the operating modulation rate such that lower modulation rates are used when the user portable device is further away and the Signal to Noise Ratio (SNR) decreased. Data speed delivery is typically directly related to the SNR. For example, a data speed 1 Mbps may require a SNR of 0 dBm while a 54 Mbps data speed may require a SNR of 25 dBm. Thus, as the data speed increases, the required SNR increases.

In addition to static power control, the present embodiment may dynamically reduce the transmitter power and receiver sensitivity on a packet-by-packet basis while maintaining the highest possible modulation rate. In doing so, the present embodiment reduces both interference noise floor and packet time duration.

Generally speaking, high capacity cells are small in order to accommodate the high number of users. These high capacity cells are typically on the order of less than about 20 m (about 65 feet) in diameter (where the AP is at the center). Radio signal strength of course decreases with distance from an AP. In certain situations, for example, if an AP typically transmits at +26 dBm EIRP, with static power control, the power may be reduced to +16 dBm (e.g., based on a receive power level at the AP), therefore, significantly reducing self-interference. At +16 dBm transmit power, users located in free space at distances up to 20 m from the AP may see static RSSI profiles of:

| Distance (meters) | Static RSSI Profile (dBm) |
|---|---|
| 1 | −24 |
| 2.5 | −32 |
| 5 | −38 |
| 10 | −44 |
| 20 | −50 |

AP transmit power may allow, for example, 10 dB of body shadowing and 10 dB of fade margin for a total of 20 dB of fade margin. A fade margin is a design allowance that provides for sufficient system gain or sensitivity to accommodate expected fading (e.g., when a portable device does not have a clear line of sight or is obstructed), for the purpose of ensuring that the required quality of service is maintained. In other words, the fade margin is an amount by which a received signal level may be reduced without causing system performance to fall below a specified threshold value.

However, using the same example, many users connected to an AP may not require a large 20 dB fade margin (e.g., if a user has a clear line of sight to an AP or holds their portable device in a way that it is not shadowed or obstructed). In this situation, the power being transmitted to this user may be dynamically decreased, limiting interference without sacrificing performance.

Although the static power control may be helpful in limiting the interference of the cell, as described in the example above, by 10 dB, it assumes all users require equal transmit power levels, which may not always be the case. Dynamic power control remedies this misconception by constantly adjusting the AP transmit power and receive sensitivity, therefore reducing it below a limit set by the static power control (or other pre-set value). This methodology allows each user portable device to receive only the power required to maintain the highest modulation rate and limits overall system level interference.

Referring back to the example above, if a user portable device located 10 meters from the AP had 3 dB of body shadowing, and a 7 dB fade margin requirement, then the AP may reduce the power seen by the device from the fixed value of −44 dBm, to, for example, −60 dBm. If the same device located 10 m from the AP were held in a different orientation, such that the shadowing may be increased from 3 dB to 10 dB, then the AP would dynamically increase the transmitted power by 7 dB to account for the increased shadowing of that user.

The dynamic power control algorithm maintains the allowed transmit power and receive sensitivity on a per-user basis, and continuously adjusts this power to ensure that the user maintains a maximum modulation rate. As a result, on-air transmission burst time is reduced while maintaining the lowest possible transmit power and receive sensitivity.

The dynamic power control algorithm has a dual benefit of (1) further reducing overall interference power in the high capacity venue; and (2) reducing the on-air transmission burst time by using the highest modulation rate for all transmissions.

A dual mode algorithm, one which uses both dynamic power control to maintain the highest data throughput/modulation rate, but also includes a dynamic modulation rate adjustment to reduce the modulation rate for occasional devices, or for e.g., voice calls, which may have different requirements compared to conventional devices or applications is described. In this mode, the dual algorithm allows, on a case-by-case basis (e.g., for specific client cards, or for specific client applications), either an increase in power, or a reduction in the modulation rate, so that the specific allowed case can be handled.

SNR Based Modulation Rate Control. Referring now to FIG. 2, a diagram of Signal to Noise Ratio (SNR) Based Modulation Rate Control is depicted. Many contemporary radios perform automatic modulation rate control, where the modulation rate at either end of the link may be adjusted to the maximum possible at a given distance. Typically, modulation rate algorithms may reduce the rate until a required error rate may be achieved. They typically accomplish this by waiting for a positive acknowledgement signal (ACK) to be received from the receiving device. However, in high capacity situations with high interference, this may often result in the modulation rate chosen being lower than what may be required to achieve a given SNR from the particular user portable device (i.e., if the desired user portable device is near but subjected to interference). Here we differentiate between interference levels and the SNR levels required to achieve given modulation rates.

To overcome this problem, the present embodiment discloses a system where each AP continuously monitors and maintains a table of the Receive Signal Strength Indication (RSSI) of all associated user portable devices. The AP's Transit (Tx) power and Receive (Rx) sensitivity for unicast packets to each device may be then adjusted to the minimum level required to achieve a desired SNR and the requisite modulation rate for that SNR may be used. This minimum level can be determined from preset or dynamic settings stored in memory in the AP based on the SNR levels required for the devices in use. As in conventional systems, this may be an incremental enhancement to the dynamic power control above in which modulation rate may be adjusted in response to the error rate on the link. Tx power, as well as Rx sensitivity, can be adjusted in Time Division Duplexing systems, based on RSSI, where the channel is reciprocal. TDD is the application of time-division multiplexing to separate outward and return signals. TDD emulates full duplex communication over a half duplex communication link. Examples of Time Division Duplexing systems may include: UMTS 3G supplementary air interfaces TD-CDMA for indoor mobile telecommunications; The Chinese TD-SCDMA 3G mobile telephony air interface; DECT wireless telephony; Half-duplex packet mode networks based on carrier sense multiple access, for example 2-wire or hubbed Ethernet, Wireless local area networks and Bluetooth, can be considered as TDD systems, albeit not TDMA with fixed frame-lengths; IEEE 802.16 WiMAX; and PACTOR.

The AP may make this adjustment on a per packet basis. As devices are typically moving fairly slowly in these environments, a fixed interval of up to several seconds may also be used. Furthermore, in order to simplify the control of the radios, using only a small number of preset candidate gain values yield acceptable results rather than a continuous range of closely spaced values.

In addition, in high interference environments, collisions cause retransmissions, which typically occur at a lower modulation rate. Ongoing collisions lead to a reduction even in the starting modulation rate for packets. This results in too many user portable devices operating at low rates, again slowing down the entire system. In this case, the system described herein limits the retransmission modulation rates to only higher levels even when collisions occur. Also, modulation rates may be set to the highest possible to reach all clients for broadcast packets or for management packets, rather than using the lowest rates. This highest possible rate is computed based on the known power level and hence modulation rate of each of the user devices.

Downstream Traffic Prioritization. Downstream Traffic Prioritization may be another factor which can be manipulated to increase downstream efficiency and throughput. When user portable devices operating at various modulation rates are communicating with an AP, a low-rate user (e.g., one carrying 1 Mbps packets) can inhibit a high-rate user (e.g., one carrying 54 Mbps packets) and reduce the overall downstream efficiency of the AP. The system disclosed herein allows for higher rate downstream packets to transmit more often, optimizing the overall efficiency of the air link.

Figure 3:
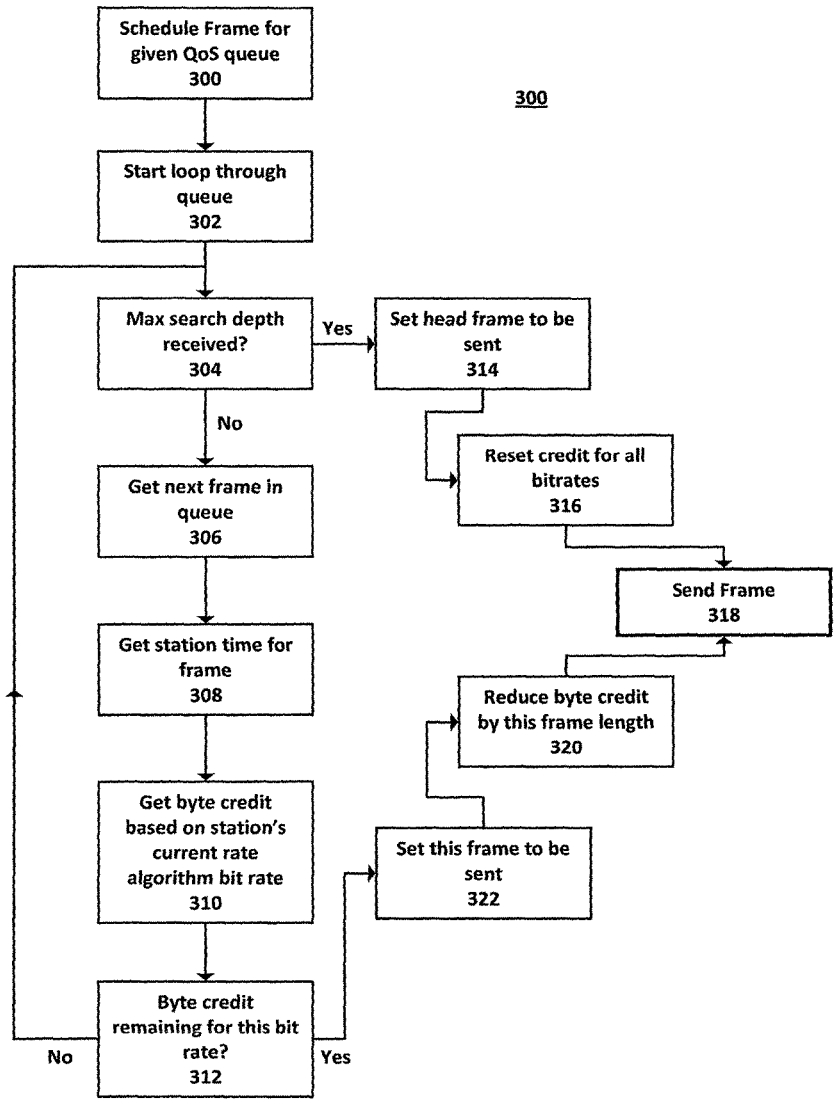
FIG. 3 is a flow diagram illustrating a first embodiment for downstream traffic prioritization.

Referring now to FIG. 3, this system may use an algorithm 300 that assigns a credit of bytes to each rate directly proportional to the modulation rate of the packet value (e.g., 54 Mbps packet may receive a credit of 54 times the credit that a 1 Mbps packet may receive) to increase the overall downstream efficiency and throughput. Prior to queuing a particular packet to the AP 318, the algorithm searches the transmit queue 302 (starting at the head of the queue) for a packet that still has remaining credits left 304. If it finds one with credit 310 it immediately queues that packet to the AP 318 and reduces the remaining credit for that rate 320. If no packets with credits are found, it may send the next packet at the head of the queue 314. This allows higher rate packets to jump ahead of the lower rate packets in the queue, resulting in a more efficient use of air-time on the channel.

Once the algorithm has used up all the credit and chooses the head packet to transmit 314, it refreshes the credit for all the rates 316. The number of retries for a transmitted packet may be also considered as it occupies the channel. The credit for a particular rate may be penalized accordingly (e.g., by removing or reducing the credit value). Keeping all the packets in one queue may be preferred (rather than using a separate queue for each rate) to maintain packet order.

Foreign Packet Rejection. In high capacity systems, all packets destined for APs that are not part of the network may unnecessarily consume AP resources. The present system can reject and/or discard those foreign packets at the very lowest processing layer in the AP. This may be accomplished by examining the destination Media Access Control (MAC) address in the header of the packet. There are at least three numbering spaces, managed by the Institute of Electrical and Electronics Engineers (IEEE), which are in common use for formulating a MAC address: MAC-48, EUI-48, and EUI-64. The IEEE claims trademarks on the names "EUI-48" and "EUI-64", where "EUI" stands for Extended Unique Identifier. If the MAC address does not match that of the AP (or its neighbors) the packets will not be processed any further.

Packet De-aggregation. Many contemporary radio protocols provide a means of aggregating multiple short packets into a single longer packet before transmitting, to prevent the excessive overhead incurred by transmitting numerous short packets and thereby improve overall throughput. The downside of this approach may be that a particular device may be "on-the-air" for a long period denying access to other devices. In this high capacity system, aggregation feature may be selectively disabled and the shorter packets are to be transmitted individually.

Admission Control. When many user portable devices are trying to access an AP, the AP may eventually be overwhelmed. Therefore, it would be advantageous to control access to the APs. This may be a form of admission control, and may be accomplished in several ways. Firstly, access may be controlled based on the number of devices. Once the number of connected devices exceeds a preset number, any further devices are denied. Thus, total throughput to each of the connected user portable devices may be limited at the AP.

Secondly, access may be limited to devices based on their received signal level (RSSI). Low signal strength devices perform at lower throughputs, occupy more air-time and block access to higher strength (and hence higher throughput devices). Therefore, the AP may deny access to the lower signal strength devices, thus improving overall performance for all devices connected to the AP.

In most cases, device rejection may be performed at the lowest level in the protocol. For example, in Wi-Fi systems, a Probe Request or Association Request management messages may be used. If access to a particular AP is denied, an automatic form of load balancing may be enforced, as the user portable device may attempt to connect to any other, potentially less congested, APs within range.

Broadcast Control. Particularly deleterious to the performance of these radio networks are broadcast packets. Example broadcast packets include: Dynamic Host Configuration Protocol (DHCP) and Address Resolution Protocol (ARP). DHCP is an Internet protocol for automating the configuration of computers that use TCP/IP. DHCP may be used to automatically assign IP addresses, to deliver TCP/IP stack configuration parameters such as the subnet mask and default router, and to provide other configuration information such as the addresses for printer, time and news servers.

ARP is a network layer protocol used to convert an IP address into a physical address (e.g., a DLC address), such as an Ethernet address. A host wishing to obtain a physical address broadcasts an ARP request to the TCP/IP network. A host on a network that has the IP address in the request then replies with its physical hardware address.

On the downstream, the only required broadcast packets are ARP Response, DHCP Offer, DHCP ACK and DHCP NAK. In the present embodiment, the AP may block all other broadcast messages. Further, the AP may block DHCP broadcasts responses for MAC addresses that are not used by an attached user portable device. The AP may also block ARP responses for IP addresses that are not use by an attached user portable device.

Physical Network Design. A variety of aspects of physical network design are also important. In particular, special AP antennas are used to reduce interference between APs. Narrow beam directional antennas with highly attenuated sidelobes and/or down titling antennas to reduce co-channel and adjacent channel interference may be used.

In applications where APs are interconnected by wireless backhaul links, the access antennas may be positioned low down to prevent self interference, while the backhaul antennas may be placed higher up to ensure the highest performance backhaul links at as close as possible to Line of Sight (LoS) conditions.

Although various embodiments have been described with reference to a particular arrangement of parts, features and the like, these are not intended to exhaust all possible arrangements or features, and indeed many other embodiments, modifications and variations will be ascertainable to those of skill in the art. Thus, it is to be understood that the invention may be practiced otherwise than as specifically described above.

What is claimed is:

1. A transmitting Wi-Fi Access Point (AP) for use in a wireless network of Wi-Fi APs and user portable devices, the transmitting Wi-Fi AP comprising
processor that is configured to dynamically and continuously adjust, based on a power of the transmitting Wi-Fi AP measured at one or more receiving Wi-Fi APs in the network a transmitter power and a receiver sensitivity of the transmitting Wi-Fi AP, wherein the processor is further configured to adjust the transmitter power on a user-portable-device-by-user-portable-device basis, to a minimum level required to achieve the highest possible modulation rate in communications with user portable devices associated with the transmitting Wi-Fi AP.

2. The transmitting Wi-Fi AP according to claim 1, wherein the processor is configured to adjust the transmitter power and receiver sensitivity below a preset limit.

3. The transmitting Wi-Fi AP according to claim 1, wherein the transmitter power is adjusted such that each user portable device associated with the transmitting Wi-Fi AP receive only a power required to maintain a usable modulation rate.

4. The transmitting Wi-Fi AP according to claim 1, wherein the transmit power is adjusted to reduce interference caused by the transmitting Wi-Fi AP while maintaining the highest possible modulation rate for each associated user portable device.

5. The transmitting Wi-Fi AP according to claim 1, wherein the transmitter power is adjusted on a user-portable-device-by-user-portable basis based on a power received at the transmitting Wi-Fi AP from each respective user portable device.

6. The transmitting Wi-Fi AP according to claim 1, wherein the processor is further configured to receive from the one or more receiving Wi-Fi APs a message with an indication of the power of the transmitting Wi-Fi AP measured at the one or more receiving Wi-Fi APs.

7. The transmitting Wi-Fi AP according to claim 1 wherein the processor is configured to adjust the transmitter power and receiver sensitivity on a packet-by-packet basis.

8. A method for a transmitting Wi-Fi Access Point operating in a wireless network of Wi-Fi APs and user portable devices, the method comprising:

dynamically and continuously adjust, based on a power of the transmitting Wi-Fi AP measured at one or more receiving Wi-Fi APs in the network, a transmitter power and a receiver sensitivity of the transmitting Wi-Fi AP, wherein the transmitter power is further adjusted on a user-portable-device-by-user-portable-device basis, to a minimum level required to achieve the highest possible modulation rate in communications with user portable devices associated with the transmitting Wi-Fi AP.

9. The method according to claim 8, wherein the transmitter power and receiver sensitivity are adjusted below a preset limit.

10. The method according to claim 8, wherein the transmitter power is adjusted such that each user portable device associated with the transmitting Wi-Fi AP receives only a power required to maintain a usable modulation rate.

11. The method according to claim 8, wherein the transmitter power is adjusted on a user-portable-device-by-user-portable basis based on a power received at the transmitting Wi-Fi AP from each respective user portable device.

12. The method according to claim 8, further comprising receiving from the one or more receiving Wi-Fi APs a message with an indication of the power of the transmitting Wi-Fi AP measured at the one or more receiving Wi-Fi APs.

13. The method according to claim 8 wherein the transmitter power is adjusted to reduce interference caused by the transmitting Wi-Fi AP while maintaining the highest possible modulation rate for each associated user portable device.

14. The method according to claim 8 wherein the transmitter power is adjusted on a packet-by-packet basis.

* * * * *

UNITED STATES PATENT AND TRADEMARK OFFICE
CERTIFICATE OF CORRECTION

PATENT NO. : 10,368,318 B2
APPLICATION NO. : 12/982081
DATED : July 30, 2019
INVENTOR(S) : Lo et al.

Page 1 of 1

It is certified that error appears in the above-identified patent and that said Letters Patent is hereby corrected as shown below:

In the Specification

In Column 5, Line 22, delete "one ore more" and insert -- one or more --, therefor.

Signed and Sealed this
Fourth Day of February, 2020

Andrei Iancu
*Director of the United States Patent and Trademark Office*